(12) United States Patent
Finison et al.

(10) Patent No.: US 12,510,545 B2
(45) Date of Patent: Dec. 30, 2025

(54) METHOD AND COMPOSITION FOR RAPID DETECTION OF PROTEIN SOILS

(71) Applicant: Ecolab USA Inc., St. Paul, MN (US)

(72) Inventors: Jeremy Brent Finison, Pine Hall, NC (US); Amani Babekir, Greensboro, NC (US); Anna Starobin, Greensboro, NC (US)

(73) Assignee: ECOLAB USA INC., St. Paul, MN (US)

( * ) Notice: Subject to any disclaimer, the term of this patent is extended or adjusted under 35 U.S.C. 154(b) by 156 days.

(21) Appl. No.: 15/427,501

(22) Filed: Feb. 8, 2017

(65) Prior Publication Data
US 2017/0227530 A1    Aug. 10, 2017

Related U.S. Application Data

(60) Provisional application No. 62/293,118, filed on Feb. 9, 2016.

(51) Int. Cl.
*G01N 33/68* (2006.01)

(52) U.S. Cl.
CPC ..... *G01N 33/6803* (2013.01); *G01N 33/6833* (2013.01)

(58) Field of Classification Search
CPC ........... G01N 33/6803; G01N 33/6833; G06Q 50/00; G06Q 50/02; G06Q 50/12; G06Q 10/0639; G06Q 10/06398; G16H 40/00; G16H 40/20; G16H 40/40
See application file for complete search history.

(56) References Cited

U.S. PATENT DOCUMENTS

| | | |
|---|---|---|
| 4,248,827 A | 2/1981 | Kitko |
| 4,839,295 A | 6/1989 | Smith |
| 5,186,232 A * | 2/1993 | Zahner ................. A47H 23/10 160/390 |
| 5,330,917 A | 7/1994 | Stone |
| 5,674,677 A | 10/1997 | Peterson |
| 5,701,635 A * | 12/1997 | Hawkes ................. E05C 17/52 16/86 A |
| 5,726,062 A | 3/1998 | Numa |
| 6,703,243 B1 | 3/2004 | Baars |
| 7,465,536 B2 | 12/2008 | Gonzalez |
| 7,718,395 B2 | 5/2010 | Carling |
| 7,780,453 B2 | 8/2010 | Carling |
| 7,811,829 B2 | 10/2010 | Kikuchi |
| 8,639,527 B2 | 1/2014 | Rensvold et al. |
| 8,778,277 B2 | 7/2014 | Jones |
| 9,029,092 B2 | 5/2015 | Akhavan-Tafti |
| 9,110,027 B2 | 8/2015 | Luotola |
| 2003/0180961 A1* | 9/2003 | Knezevic ............. G01N 33/526 422/412 |
| 2004/0081979 A1 | 4/2004 | Knezevic |
| 2005/0037501 A1 | 2/2005 | Meyer et al. |
| 2005/0250168 A1 | 11/2005 | Gonzalez |
| 2005/0250169 A1 | 11/2005 | Gonzalez |
| 2006/0073999 A1 | 4/2006 | Sgargetta |
| 2006/0166367 A1 | 7/2006 | Satoh |
| 2006/0182654 A1 | 8/2006 | Cumberland |
| 2006/0216196 A1 | 9/2006 | Satoh |
| 2007/0074742 A1 | 4/2007 | Lin |
| 2007/0202491 A1 | 8/2007 | Hendrix |
| 2008/0003144 A1* | 1/2008 | Cumberland ......... B01L 3/5029 422/400 |
| 2008/0227219 A1 | 9/2008 | Gamez |
| 2009/0124526 A1 | 5/2009 | De Leersnyder |
| 2009/0276239 A1* | 11/2009 | Swart ............... G06Q 10/06375 705/2 |
| 2010/0197027 A1 | 8/2010 | Zhang |
| 2010/0197037 A1 | 8/2010 | Herrlein |
| 2010/0267071 A1 | 10/2010 | Akhavan-Tafti |
| 2010/0317123 A1* | 12/2010 | Luotola ................ G01N 33/523 436/94 |
| 2012/0208733 A1 | 8/2012 | Quarles |
| 2012/0329081 A1 | 12/2012 | Bennion |
| 2014/0255566 A1* | 9/2014 | Cuomo ................... A23L 35/00 426/231 |

FOREIGN PATENT DOCUMENTS

| | | |
|---|---|---|
| AU | 2000020821 U | 9/2000 |
| AU | 2002333526 | 6/2003 |
| AU | 2005100063 | 5/2005 |
| AU | 2005245777 | 5/2010 |

(Continued)

OTHER PUBLICATIONS

Kratz, F et al. Characterization of protein films on dental materials: Bicinchoninic acid assay (BCA) studies on loosely and firmly adsorbed protein layers. Phys. Status Solidi A. 2013. 210(5): 964-967. (Year: 2013).*

(Continued)

*Primary Examiner* — David W Berke-Schlessel
*Assistant Examiner* — Susan E. Fernandez
(74) *Attorney, Agent, or Firm* — Merchant & Gould, P.C.

(57) ABSTRACT

A method for detecting presence of protein or biofilm on a surface includes applying a composition to the surface, and observing a color reaction if protein or biofilm is present on the surface. The composition comprises a first part that includes copper sulfate and a second part that includes a reagent capable of reacting with the copper sulfate to produce a visible color reaction when contacted with protein or biofilm.

21 Claims, No Drawings

(56) References Cited

FOREIGN PATENT DOCUMENTS

| | | | |
|---|---|---|---|
| CA | 2714094 | | 5/2015 |
| CN | 101975775 | | 2/2011 |
| CN | 101946178 | | 11/2014 |
| DE | 60015832 | | 10/2005 |
| EP | 1370680 | | 4/2006 |
| IN | 201007276 | | 8/2011 |
| JP | 08-159975 | | 6/1996 |
| JP | 11-281577 | A | 10/1999 |
| JP | 2001-041954 | | 2/2001 |
| JP | 2001-305143 | A | 10/2001 |
| JP | 2002-513947 | A | 5/2002 |
| JP | 03-374146 | | 2/2003 |
| JP | 2007-125371 | | 5/2007 |
| JP | 2007-514952 | A | 6/2007 |
| JP | 05-105956 | | 12/2012 |
| JP | 05-525516 | | 6/2014 |
| JP | 2014-514547 | A | 6/2014 |
| JP | 05-698904 | | 4/2015 |
| MX | 319820 | | 5/2014 |
| WO | WO2000078914 | | 12/2000 |
| WO | WO2001096516 | | 12/2001 |
| WO | WO2002039098 | | 5/2002 |
| WO | WO-2006081185 | A1 * | 8/2006 ............ B01L 3/5029 |
| WO | WO2008004199 | | 1/2008 |
| WO | WO2008117233 | | 10/2008 |
| WO | WO2008117235 | | 10/2008 |
| WO | WO2009005884 | | 1/2009 |
| WO | WO2009027925 | | 3/2009 |
| WO | WO2009103843 | | 8/2009 |
| WO | WO2009140356 | | 11/2009 |
| WO | WO2010099486 | | 9/2010 |
| WO | WO2012088054 | | 6/2012 |

OTHER PUBLICATIONS

Walker, JM. "Chapter 3: The bicinchoninic acid (BCA) assay for protein quantitation." in: Walker, JM., The Protein Protocols Handbook. Second Edition. (New York, Humana Press, 2002). pp. 11-14. (Year: 2002).*
CN 101975775. Derwent English abstract. Feb. 16, 2011. (Year: 2011).*
Akins, RE et al. "Chapter 5: Ultrafast protein determinations using microwave enhancement." in Walker, JM, The Protein Protocols Handbook. Second Edition. (New York, Humana Press, 2002). pp. 23-30. (Year: 2002).*
Schmidlin, PR et al. Polyspecies biofilm formation on implant surfaces with different surface characteristics. J. Appl. Oral Sci. 2013. 21(1): 48-55. (Year: 2013).*
Flemming, H et al. The biofilm matrix. Nature Reviews: Microbiology. Sep. 2010. 8: 623-633. (Year: 2010).*
Uettwiller, I et al. Quantification of protein adsorption onto the surface of single-use flexible containers. BioProcess International. Jun. 2006. Supplement. 4(6): 22-26. (Year: 2006).*
Nakanishi, K et al. On the adsorption of proteins on solid surfaces, a common but very complicated phenomenon. Journal of Bioscience and Bioengineering. 2001. 91(3): 233-244. (Year: 2001).*
Stier, RF. Preventive Maintenance: An essential prerequisite for food safety. Food Safety Magazine. Apr./May 2012. [online]. [Retrieved Oct. 7, 2018]. Retrieved: <URL: https://www.foodsafetymagazine.com/magazine-archive1/april-may-2012/preventive-maintenance-an-essential-prerequisite-for-food-safety/>. (Year: 2012).*
CN 101975775. Feb. 16, 2011, Machine Translation.*
Zhang, J et al. pH and buffering in the bicinchoninic acid (4,4'-dicarboxy-2,2'-biquinoline) protein assay. Analytical Biochemistry. 1990. 188: 9-10. (Year: 1990).*
Houghton, R. Field Confirmation Testing for Suspicious Substances. 2009. Taylor & Francis Group, LLC. pp. xxi, 75, 160, and 161. (Year: 2009).*
Smith et al., "Measurement of protein using bicinchoninic acid," Anal Biochem., 150(1):76-85, Oct. 1985.
International Search Report and Written Opinion for PCT/US2017/017036, mailed May 22, 2017, 12 pages.
"Surfactant Encyclopedia," Cosmetics & Toiletries, 104(2): 71-86 (1989).
Extended European Search Report for EP Appln. No. 17750705.0, dated Jul. 26, 2019.
Extended European Search Report for EP17750705.0, mailed Jul. 26, 2019.
Anderson et al., "A Simple Qualitative Method for Detecting Cleanliness of Food Contact Surfaces," Journal of Food Protection, vol. 49, No. 5, pp. 342-346 (May 1986).
Hammons et al., "Aerobic Plate Counts and ATP Levels Correlate with Listeria monocytogenes Detection in Retail Delis," Journal of Food Protection, vol. 78, No. 4, pp. 825-830 (2015).
Ho et al., An instantaneous colorimetric protein assay based on spontaneous formation of a protein corona on gold nanoparticles, Analyst, vol. 140, pp. 1026-1036 (2015).
Japanese Society of Medical Instrumentation, Sterilization Technician Qualification Committee, Working Group for Investigating and Preparing Guidelines for Evaluation and Assessment of Cleaning, Guidelines for Evaluation and Assessment of Cleaning, Aug. 15, 2012.
Pierce™ BCA Protein Assay Kit Instructions, Thermo Scientific, 7 pages (Copyright 2013).
Yutaka Shimazaki, "Effectiveness of Amido black 10B in Cleaning Evaluation and Method for Removing Strong Protein Contamination," Japanese Journal of Medical Instrumentation, vol. 82, Issue 2, p. 184, (Apr. 1, 2012).

* cited by examiner

METHOD AND COMPOSITION FOR RAPID DETECTION OF PROTEIN SOILS

CROSS REFERENCE TO RELATED APPLICATION

This application claims the benefit of U.S. Provisional Application No. 62/293,118, filed Feb. 9, 2016 which is hereby incorporated in its entirety.

FIELD

The present disclosure relates to compositions and methods for detection of protein-based soils and biofilms. In particular, the present disclosure relates to compositions and methods that can be used for rapid detection of protein soils or biofilms on surfaces. The present disclosure further relates to methods for using the disclosed composition for improving and developing cleaning methods and training personnel on cleaning methods.

BACKGROUND

The efficacy of cleaning procedures is important for effectively sanitizing and for reducing microbiological contamination, for example, in the food supply chain and at healthcare facilities. For example, cleaning procedures used in food preparation and food storage areas or in patient treatment areas should be adequate for removing various soils that can harbor bacteria, viruses, and other microorganisms, or attract pests.

Although the presence of soil does not automatically mean the presence of pathogens, a soiled surface is more likely to harbor pathogens than a clean surface, and may attract pests. However, cleaning methods are not always completely effective at removing all of the soil on the surface. The cleaning method can be inefficient at removing some soils, the cleaning staff may not follow cleaning procedures, or tools or chemicals used in the method may be inefficient.

It is against this background that the present disclosure is made.

SUMMARY

A method for detecting presence of protein or biofilm on a surface includes applying a composition to the surface and observing a color reaction if protein or biofilm is present on the surface. The composition comprises a first part that includes copper sulfate and a second part that includes a reagent capable of reacting with the copper sulfate to produce a visible color reaction when contacted with protein or biofilm. The composition has a pH below 11.5.

DETAILED DESCRIPTION

Several methods exist for testing for various soils and/or the presence of pathogens. However, most of those methods require trained laboratory personnel, expensive or complicated equipment, and/or a long wait time to receive results. Some methods, such as ATP (adenosine triphosphate) and bacterial cultures, rely on a swab to test a surface. However, these test methods only test the area that was swabbed and thus do not provide an indication for organic matter or bacteria over an entire surface. Further, these tests are known to provide false positives and have interactions with commonly used cleaning chemicals and tools that provide misleading results. Further, results with a swab or culture can vary depending on the specific technique used by the person taking the swab. To cover a large surface area, a large number of swabs are needed, which makes this a very expensive test method.

Some methods used to detect presence of biofilms provide results within a few minutes by spraying a liquid composition containing hydrogen peroxide. Hydrogen peroxide may react with microorganisms that are positive for catalase enzyme, such as *Staphylococcus*, *Listeria*, or *E. coli*, to produce gas when the microorganisms are present at sufficient levels. However, the test cannot detect organisms that are catalase negative, such as *Streptococci* or *Enterococci*.

Various assays (e.g., the Smith assay, Lowry protein assay, Bradford protein assay, PIERCE™ BCA Protein assay) based on the biuret reaction are known as reliable methods for quantitatively measuring proteins in liquid samples. The biuret reaction involves reduction of $Cu^{2+}$ to $Cu^{1-}$, and the reaction of $Cu^{1+}$ with a compound that forms a colored complex with the copper. For example, some of the assays use a strongly alkaline solution of bicinchoninic acid (BCA) salt, copper(II) salt, and sodium tartrate, which in the presence of protein develop a purple color. However, using the assays requires trained laboratory personnel and a laboratory equipped with a colorimetric device (e.g., a UV-VIS reader). The assays typically include an incubation period (e.g., a 30 min or longer) for the color reaction to occur. A biuret assay kit is commercially available, for example, from Thermo Fisher Scientific Inc. in Waltham, MA.

The present disclosure provides compositions and methods for rapidly testing for the presence of proteins or biofilm on surfaces and thus provide an indication as to whether the surface is soiled with a protein-containing soil or biofilm. The compositions and methods can also be used as part of monitoring cleaning efficacy, since proteins and biofilms should be removed with proper cleaning. When used as part of a cleaning program, the compositions and methods are suitable for monitoring the presence of proteins and biofilms on surfaces, providing feedback on the efficacy of cleaning procedures, developing or improving cleaning procedures, and for training cleaning personnel in proper cleaning procedures.

According to embodiments, the method includes applying the composition onto a surface and observing a color reaction. The composition can generally be applied by spraying, misting, swabbing, sponging, dripping, pouring, wiping, or any other suitable method. The composition may be a two-part solution that is mixed upon application, or a one-part solution that is prepared prior to application. The one-part solution can be prepared on-site prior to application (e.g., within a few minutes or up to one week), or can be a ready-to-use solution.

The method and composition can be used in food and beverage processing facilities and service establishments, such as processing plants, industrial kitchens, institutional kitchens, food storage areas, full service and quick service restaurants, cafeterias, grocery stores, as well as home kitchens and food storage areas. For example, the method and composition can be used to monitor cleaning procedures at meat processing plants, restaurant kitchens, or grocery store delicatessens ("delis"). The method and composition can further be used in healthcare settings, such as hospitals, clinics, and other healthcare and long-term care facilities. For example, the method and composition can be used to detect proteins and biofilms in operating rooms, emergency rooms, patient rooms, or other areas and therefore provide an indication that a surface is soiled.

The composition can be applied to various surfaces, including hard surfaces and some porous or soft surfaces. The surfaces can include rough, smooth, or polished surfaces. Examples of surfaces that the composition can be applied to include metal, hard plastic, pliable plastic, wood, treated wood, composite, stone, rubber, and fabrics.

According to an embodiment, the composition develops a color within about 60 seconds or less, within about 10 seconds, within about 5 seconds, within about 3 seconds, within about 2 seconds, or within about 0.5 to about 45 seconds, or about 1 to about 30 seconds, or about 1 to about 10 seconds of application of the composition to a surface, when the composition reacts with protein or biofilm. The composition can be applied to the surface, and the color reaction will develop where protein or biofilm is present. In at least some of the embodiments, the color is visible to the human eye, and may become stronger (e.g., darker or more intense or saturated) over time. For example, the color may start to become visible in about 2 to 3 seconds, and may increase in intensity over the next 10 to 120 seconds.

In the embodiments, the composition comprises active ingredients that develop a color reaction when they come into contact with proteins or biofilm present on the surface. The composition may comprise a first part and a second part, which in the presence of protein or biofilm react to form a color reaction. The first and second part can be provided separately as a two-part solution that is mixed upon application or shortly prior to application, or as a one-part solution. The composition may further be provided as a concentrate or as a use solution. A concentrate composition (whether one-part or two-part) may be diluted to form a use solution prior to use with a suitable diluent, such as water or another aqueous solution. In some embodiments, the composition is provided as a powder concentrate that can be prepared by dissolving the powder(s) into a suitable solvent, such as an aqueous solvent.

In some embodiments, the first part comprises an aqueous solution of hydrated copper(II) sulfate (e.g., copper (II) sulfate pentahydrate or another suitable hydrate). A one-part use solution may comprise about 0.005 to 1.0 wt-%, about 0.01 to 0.5 wt-%, about 0.02 to 0.2 wt-%, or about 0.05 to 0.1 wt-% of hydrated copper(II) sulfate. If the composition is provided as a two-part solution, the first part comprising the copper sulfate may comprise about 0.01 to 0.5 wt-%, about 0.05 to 0.3 wt-%, about 0.10 to 0.25 wt-%, or about 0.12-0.18 wt-% of hydrated copper(II) sulfate. The first part may further comprise stabilizing agents, such as tartaric acid or salts thereof (e.g., sodium tartrate), iodides (e.g., potassium iodide), alkalinity sources, such as metal hydroxides or carbonate salts and buffering agents (e.g., sodium hydroxide, sodium carbonate, and sodium bicarbonate, or citric acid and sodium citrate).

The second part may comprise an aqueous solution of a reagent that is capable of reacting with $Cu^{1+}$ and forming a colored product, such as bicinchoninic acid (BCA) or a salt thereof; salicylic acid or a salt thereof; 3-hydroxyflavone; or certain organic acids and their salts. Examples of suitable organic acids include ascorbic acid, citric acid, or an organic acid having a benzene ring structure. In one embodiment, the organic acid is capable of chelating copper ions.

The amount of the reagent intended to react with $Cu^{1+}$ can be adjusted based on the amount of copper(II) sulfate. Also, the amount of the first part mixed with the second part can be adjusted. The first part of the two-part solution will be mixed with the second part so that the ratio of copper sulfate to the copper sequestrant (e.g., BCA) is about 10:1 to 1:20, about 5:1 to 1:15, about 1:1 to 1:10, or about 1:3 to 1:7 on a weight basis. In a preferred embodiment, the ratio of copper sulfate to the copper sequestrant (e.g., BCA) is about 1:3 to 1:4.5. In some embodiments, the second part of a two-part solution may comprise about 0.2 to about 3.0 wt-%, about 0.4 to about 2.0 wt-%, or about 0.5 to about 1.5 wt-% of the reagent capable of reacting with $Cu^{1+}$. The second part may further comprise alkalinity sources, such as metal hydroxides or carbonate salts, tartaric acid or a salt thereof (e.g., sodium tartrate) and buffering agents (e.g., sodium hydroxide, sodium carbonate, and sodium bicarbonate, or citric acid and sodium citrate). If the composition is prepared as a one-part solution, the composition may comprise about 0.05 to about 3.0 wt-%, about 0.1 to about 2.0 wt-%, or about 0.2 to about 1.5 wt-% of the reagent capable of reacting with $Cu^{1+}$.

In embodiments where the composition is provided as a two-part solution for spraying, the relative amounts of the first part and the second part can be adjusted to adjust the speed of the color reaction.

In one exemplary embodiment, the first part is prepared with about 0.15 wt-% biuret, and the second part is prepared with about 1.0 wt-% BCA. The first and second parts are applied using a two-chamber spray bottle, where the first part is in one chamber and the second part is in another chamber. The first and second parts get mixed upon application when the composition is sprayed from the bottle. The spray bottle is adjusted to draw the first part and the second part at a ratio of about 50:1 to about 1:3, or any ratio therebetween, such as 1:1, 1.5:1, 1.85:1, 2:1, 2.25:1, 2.5:1, 3:1, 4:1, etc. In one embodiment, the spray ratio is adjusted to about 1.85:1. In another embodiment, the spray ratio is adjusted to about 1.5:1, and in yet another embodiment, to about 2.2:1. The amounts of solution and active ingredient (copper sulfate and copper sequestrant, e.g., BCA) in the exemplary embodiment are shown in TABLE 1 below.

TABLE 1

| | | Spray Ratio (by volume) | | | | |
|---|---|---|---|---|---|---|
| | | 1:1 | 1.5:1 | 1.8:1 | 2.2:1 | 50:1 |
| $1^{st}$ part | Solution | 0.35-0.55 g | 0.42-0.66 g | 0.45-0.72 g | 0.48-0.76 g | 0.69-1.1 g |
| | Active | 0.53-0.83 mg | 0.63-0.99 mg | 0.68-1.1 mg | 0.72-1.1 mg | 1.0-1.6 mg |
| $2^{nd}$ part | Solution | 0.35-0.55 g | 0.28-0.44 g | 0.25-0.39 g | 0.22-0.34 g | 0.014-0.022 g |
| | Active | 3.5-5.5 mg | 2.8-4.4 mg | 2.5-3.9 mg | 2.2-3.4 mg | 0.14-0.22 mg |
| Ratio of Actives (by weight, $1^{st}:2^{nd}$) | | 1:6.6 | 1:4.4 | 1:3.7 | 1:3.1 | 7.1:1 |

The pH of the composition (e.g., the first part and the second part, or the mixed formulation) may be in the range of about 8 or higher, e.g., from about 8 to about 13.5, from about 8.5 to about 13, from about 9 to about 12.5, from about 9.5 to about 12, from about 10 to about 11.5, or from about 10.5 to about 11.4. Preferably, the pH of the composition is such that the composition can be used without personal protective equipment ("PPE"), such as gloves, goggles, protective clothing, etc. PPE is typically required when working with solutions about pH 11.5 and above. Therefore, according to an embodiment, the pH of the composition is below 11.5. In one embodiment, pH of the composition is about 10.8-11.4. The pH of the composition can be adjusted by including typical pH adjusting agents, such as acids or bases. Suitable acids include organic acids, such as carboxylic acids (e.g., formic acid, acetic acid, propanoic acid, butanoic acid, pentanoic acid, hexanoic acid, heptanoic acid, octanoic acid, nonanoic acid, decanoic acid, undecanoic acid, dodecanoic acid, glycolic acid, lactic acid, salicylic acid, acetylsalicylic acid, mandelic acid, etc.), and inorganic acids, such as mineral acids (e.g., phosphoric acid, nitric acid, hydrochloric acid, sulfuric acid). Suitable bases include, for example, alkali metal hydroxide (e.g., NaOH, KOH), carbonate salts (e.g., sodium carbonate, sodium bicarbonate).

In some embodiments, the composition may comprise additional agents. For example, the composition may include diluents, solubilizers, stabilizers, surfactants, foaming agents, emulsifiers, rheology modifiers, colorants, fragrance, etc.

According to embodiments, the composition comprises one or more diluents. Suitable diluents include, for example, water, alcohols, glycol ether, or other water-soluble organic solvents. Examples of suitable alcohols include methanol, ethanol, propanol, isopropanol, butanol, glycol, propanediol, and butanediol. The diluent may also act as a solubilizer.

Examples of suitable stabilizers include alkali metal salts such as bicarbonates, carbonates, potassium sodium tartrate and their hydrates (organic acid salts), potassium iodide, dibasic acids, and combinations thereof; alkali metal hydroxides such as potassium or sodium hydroxide and combinations thereof.

The composition may also comprise suitable surfactants, such as nonionic, anionic, or amphoteric surfactants. Anionic surfactants include those with a negative charge on the hydrophobic group or surfactants in which the hydrophobic section of the molecule carries no charge unless the pH is elevated to neutrality or above (e.g. carboxylic acids). Anionic surfactants can be used as detersive surfactants, gelling agents as part of a gelling or thickening system, solubilizers, for hydrotropic effect, or for cloud point control. The majority of large volume commercial anionic surfactants can be subdivided into five major chemical classes and additional sub-groups known to those of skill in the art and described in "Surfactant Encyclopedia," Cosmetics & Toiletries, Vol. 104 (2) 71-86 (1989). The first class includes acylamino acids (and salts), such as acylglutamates, acyl peptides, sarcosinates (e.g. N-acyl sarcosinates), taurates (e.g. N-acyl taurates and fatty acid amides of methyl tauride), and the like. The second class includes carboxylic acids (and salts), such as alkanoic acids (and alkanoates), ester carboxylic acids (e.g. alkyl succinates), ether carboxylic acids, and the like. The third class includes phosphoric acid esters and their salts. The fourth class includes sulfonic acids (and salts), such as isethionates (e.g. acyl isethionates), alkylaryl sulfonates, alkyl sulfonates, sulfosuccinates (e.g. monoesters and diesters of sulfosuccinate), and the like. The fifth class includes sulfuric acid esters (and salts), such as alkyl ether sulfates, alkyl sulfates, and the like.

Nonionic surfactants are generally characterized by the presence of an organic hydrophobic group and an organic hydrophilic group and are typically produced by the condensation of an organic aliphatic, alkyl aromatic or polyoxyalkylene hydrophobic compound with a hydrophilic alkaline oxide moiety which in common practice is ethylene oxide or a polyhydration product thereof, e.g., polyethylene glycol. Examples of suitable nonionic surfactants include alkyl-, aryl-, and arylalkyl-, alkoxylates, alkylpolyglycosides and their derivatives, amines and their derivatives, and amides and their derivatives. Additional useful nonionic surfactants include those having a polyalkylene oxide polymer as a portion of the surfactant molecule. Such nonionic surfactants include, for example, chlorine-, benzyl-, methyl-, ethyl-, propyl-, butyl- and other like alkyl-capped polyoxyethylene and/or polyoxypropylene glycol ethers of fatty alcohols; polyalkylene oxide free nonionics such as alkyl polyglycosides; sorbitan and sucrose esters and their ethoxylates; alkoxylated ethylene diamine; carboxylic acid esters such as glycerol esters, polyoxyethylene esters, ethoxylated and glycol esters of fatty acids, and the like; carboxylic amides such as diethanolamine condensates, monoalkanolamine condensates, polyoxyethylene fatty acid amides, and the like; and ethoxylated amines and ether amines and other like nonionic compounds. Silicone surfactants can also be used. Nonionic surfactants having a polyalkylene oxide polymer portion include nonionic surfactants of C6-C24 alcohol ethoxylates having 1 to about 20 ethylene oxide groups; C6-C24 alkylphenol ethoxylates having 1 to about 100 ethylene oxide groups; C6-C24 alkylpolyglycosides having 1 to about 20 glycoside groups; C6-C24 fatty acid ester ethoxylates, propoxylates or glycerides; and C4-C24 mono or dialkanolamides.

Amphoteric and zwitterionic surfactants include derivatives of secondary and tertiary amines, derivatives of heterocyclic secondary and tertiary amines, or derivatives of quaternary ammonium, quaternary phosphonium or tertiary sulfonium compounds. The ammonium, phosphonium, or sulfonium compounds can be substituted with aliphatic substituents, e.g., alkyl, alkenyl, or hydroxyalkyl; alkylene or hydroxy alkylene; or carboxylate, sulfonate, sulfate, phosphonate, or phosphate groups.

The composition may include corrosion inhibitors. For example, the composition may include silicates, such as alkali metal silicates, or phosphate esters to help protect aluminum surfaces.

The solution may optionally include one or more rheology modifiers (e.g., thickeners or gellants). Suitable inorganic thickeners are generally compounds such as colloidal magnesium aluminum silicate, colloidal clays (Bentonites), or fumed silicas. Suitable natural hydrogel thickeners include salts of complex anionic polysaccharides, such as tragacanth, karaya, and acacia gums; and extractives such as carrageenan, locust bean gum, guar gum and pectin; or pure culture fermentation products such as xanthan gum. Suitable synthetic natural-based thickeners include cellulose derivatives, such as alkyl and hydroxyllalkycelluloses, specifically methylcellulose, hydroxyethylmethylcellulose, hydroxypropylmethylcellulose, hydroxybutylmethycellulose, hydroxyethylcellulose, ethylhydroxyethylcellulose, hydroxypropylcellulose, and carboxymethylcellulose. Synthetic petroleum-based water soluble polymers suitable for use as thickeners include polyvinylpyrrolidone, polyvinylmethylether, polyacrylic acid and polymethacrylic acid, polyacrylamide, polyethylene oxide, and polyethyleneimine.

The composition may optionally include various dyes, fragrances, and other aesthetic enhancing agents. Preferred dyes include FD&C dyes, D&C dyes, and the like.

According to some embodiments, the composition may be a two-part solution that is mixed upon application, and includes a first part and a second part. The two parts can be mixed in a container (e.g., a bottle) prior to use, or can be mixed in the applicator itself, such as in the nozzle of a two-chamber spray bottle, or in a spray nozzle. Alternatively, the composition can be provided as a one-part solution that is prepared prior to application (e.g., up to one or two weeks prior to application), or can be a ready-to-use solution.

The composition may be provided in a spray bottle and applied by spraying. In some embodiments, the composition is provided in a two-chamber spray bottle, where the first part is in one chamber and the second part is in another chamber. The first and second parts get mixed upon application when the composition is sprayed from the bottle. The composition may also be provided in a single-chamber spray bottle, where the first and second parts are mixed. The composition may alternatively be provided in a wipe, a dropper, an ampule with an applicator tip (e.g., a sponge tip), a test strip, or a container with a pump and a spray nozzle for application to larger areas.

The composition can generally be applied by spraying, misting, foaming, spot application, dripping, pouring, wiping, swabbing, or any other suitable method.

In some embodiments, the composition can be provided for use with a swab. For example, one part of the two-part solution can be impregnated onto the swab and the other part provided separately (e.g., in a bottle, spray bottle, dropper, or pre-moistened pad). The composition can then be used by swabbing the test surface with the swab and applying the other part to the swab, or by spraying the other part onto the test surface and swabbing the sprayed test surface with the swab.

In some embodiments, the composition may be used as part of a training program to improve cleaning procedures. If proper cleaning chemicals, tools and techniques are used to clean a surface, the surface should have no protein or biofilm on it after it has been cleaned.

Therefore, if a surface has just been cleaned and the disclosed compositions show a color change indicating the presence of protein or biofilm on the surface, then that surface was not properly cleaned in part because of poor cleaning chemicals, tools, or techniques.

The disclosed compositions can be used to improve overall cleaning when used as part of a training program. For example, cleaning staff can be educated on the proper use of cleaning chemicals, such as which chemicals to use for which applications, the appropriate chemical concentration and amount to use, the approximate shelf life for the chemicals and when the cleaning solution should be replaced or new cleaning solution should be used. In certain locations, such as restaurants and food plants, cleaning chemicals may be provided as a concentrate that is diluted onsite to a use solution. The use solution may be stored in a container, such as a bottle, a bucket, or a spray bottle. Over time, those use solutions can lose their efficacy as the solution becomes contaminated with soil or is exposed to the air. Further, heavily soiled use solutions can actually become a source of contamination for a surface. From time to time, the old solution should be disposed of and new solution should be prepared and/or used in order for the use solution to be effective. A training program can be used to provide information on the efficacy of cleaning procedures. With respect to cleaning tools, cleaning staff can be educated on which cleaning tool to use for which application and when to replace the cleaning tool. In restaurants and food plants, commonly used cleaning tools include cleaning cloths and towels (e.g., microfiber cloths and towels), squeegees, brushes, mops, buckets, scrapers, sponges, and wipes. Over time, cleaning tools, such as cloths, towels, and wipes, may become soiled and a source of contamination and should be replaced. Other cleaning tools (e.g., squeegees, scrapers) may become damaged and need to be replaced in order to be effective. With respect to cleaning techniques, cleaning staff can be educated on proper cleaning techniques, sources of contamination, protein and biofilm soils, and the like.

In some embodiments, the disclosed compositions and methods can be used in conjunction with an audit program. Such an audit program can determine if a surface (e.g., a surface on a predetermined list of surfaces) has protein or biofilm on it after the surface has been cleaned. The audit program can utilize a scoring system, such as a system based on a pass/fail score. For example, the absence of protein or biofilm would indicate that the surface was properly cleaned and therefore is given a "pass". Conversely, the presence of protein or biofilm would indicate that the surface was not properly cleaned and that surface would be given a "fail". The pass/fail scores for the various surfaces could be tallied and used to provide an alpha/numeric grade, score, or a pass/fail rating. Such grades, scores, or ratings could be collected for an individual cleaning staff member or aggregated by shift, location (such as a restaurant location), geography, or enterprise. Such grades, scores, or ratings could be compared to a baseline score to determine a trend or could be compared to other geographies or locations or an aggregated benchmark to provide a comparison with similar establishments. Scores could be collected and aggregated manually using paper or electronically using a computer application or a combination.

In a restaurant, exemplary surfaces for determining the presence of protein or biofilm include food preparation surfaces, food storage areas and surfaces, and food serving surfaces. In a grocery store or deli, exemplary surfaces for determining the presence of protein or biofilm include food preparation surfaces, food storage areas and surfaces, food serving surfaces, and display areas and surfaces. In a food plant, exemplary surfaces for determining the presence of protein or biofilm include surfaces in and on preparation and slaughter areas and equipment, manufacturing areas and equipment, packaging areas and equipment. Examples of surfaces, structures, and devices in food service facilities include countertops, tables, shelves, trays, cutting boards, containers, coolers, refrigerators, freezers, cooking surfaces, display areas and cases, slaughter and clean-up areas, sinks and surrounding areas, equipment, such as cutters, mixers, tanks, extruders, conveyors, heaters, dryers, ovens, and the like, floors, drains, wall tile, etc. In a hospital or healthcare setting, exemplary surfaces for determining the presence of protein or biofilm include surfaces in and on waiting rooms, patient rooms, preparation rooms, operating rooms. Examples of surfaces, structures, and devices in health care settings include countertops, tables, shelves, trays, containers, patient rooms, operating rooms, preparation areas, waiting areas, doors, door knobs, beds, bed rails, other furniture, hand rails, medical and dental equipment and instruments, sinks and surrounding areas, toilets, bed pans, shower rooms, floors, walls, drains, cleaning tools, telephones, call buttons, remote controls, etc.

When used as part of a training program or evaluation, it may be desirable to first collect a baseline score. Collecting a baseline score may involve evaluating and scoring the cleanliness of the target areas based on the presence of protein or biofilm without changes to cleaning procedures. After the baseline score is collected, a formal training program may be implemented, training cleaning personnel on cleaning chemicals, tools, and/or techniques. Thereafter, cleaning scores may be collected again to determine the prevalence of protein and biofilm soils after cleaning. This process can be repeated as part of an ongoing, continuous improvement process and as part of training of new staff members to ensure that surfaces do not remain soiled after they have been cleaned.

In one exemplary embodiment of a training program or evaluation, cleaned surfaces are tested by employees, managers, quality assurance personnel, an auditing organization, or a vendor. The surfaces can be tested after each cleaning, and/or at random intervals. The tested value can be scored or can be compared to a threshold value to render a pass/fail score, and can be monitored over time. Training on the cleaning procedures is repeated for areas that do not pass the test either because they are difficult to clean or have been inadequately cleaned. The test results can also be used to adjust the cleaning and sanitation procedures, chemicals, or equipment. For example, long-term monitoring of test results may reveal an area where the existing procedures, chemicals, or equipment are inadequate to achieve desired results. Additional training opportunities can be identified based on the recorded history of the test results. The test results may also be included as part of employee evaluations, and may be used to adjust rewards or compensation to incentivize proper use of cleaning and sanitation procedures, and to provide positive feedback and boost morale of cleaning personnel.

In some embodiments, it may be desirable to have the audit conducted covertly to avoid a Hawthorne effect (a change in behavior in response to awareness of being monitored). In some embodiments, it may be desirable to conduct the audit together with the cleaning staff in order to provide the staff member with a visual indication of where surfaces can be cleaned better to completely remove protein and biofilm soils. For example, it may be the case that 90% of a surface is being cleaned properly but an area (such as a corner or a hard-to-reach area) is routinely missed. In some embodiments, it may be desirable to use a combination of covert and overt auditing where the cleaning staff member is unaware before cleaning that they will be audited but once the cleaning is complete, the audit is conducted with the staff member in order to see if the cleaning effectively removed the protein and biofilm soils.

In some embodiments, the composition is applied to cover the surface, or to cover a substantial portion of the surface (e.g., about 75% or more, or about 90% or more) to be tested. The composition can be applied by spraying, misting, wiping, pouring, or any other method that is suitable for application to areas. In one embodiment, the composition is applied by spraying so as not to disturb (e.g., to remove, transfer, or redistribute) the protein or biofilm on the surface. A color reaction may be observed within about 1 to 120 seconds, or within about 2 to about 60 seconds, within about 3 to about 45 seconds, or about 3 to about 30 seconds, or about 5 to about 20 seconds of application of the composition to the surface if protein or biofilm is present on the surface. The color may become darker over time. The color reaction can be observed either visually or by using a color-detecting instrument (e.g., a colorimeter).

In one embodiment, the composition is added to spot check the surface for soil or biofilm by applying the composition from an ampule with an applicator tip, sponge, or dropper, or with a swab. In another embodiment, the composition is applied by wiping with a wipe moistened with the composition. The color may be either observed on the surface or on the wipe.

In some embodiments, the cleaning scores are collected into a database and used to generate reports showing cleaning scores over time, by surface, by staff member, by shift, by location, by enterprise, compared against a baseline score, or a combination thereof. These reports can be shared with cleaning staff as part of the training program. The scores can either be manually entered into a database or collected using an application on a smart phone, tablet or computer. Information fields for data collection can be adjusted based on the environment the application is used in and the data that is desired to be collected. For example, the application or software program can include data fields for employee, date, time, location, room, surface identification, site, color result, corrective action, etc.

In preferred embodiments the composition is safe and non-toxic, such that the composition can be used without PPE and can be removed from surfaces with a water rinse or a light wash.

In one aspect, methods of the present disclosure include applying the composition onto a surface and observing a color reaction. The composition may be a two-part solution that is mixed upon application, or a one-part solution that is prepared prior to application. The one-part solution can be prepared on-site prior to application (e.g., within a few minutes or up to one week), or can be a ready-to-use solution. The first and second parts of the composition can be provided separately as a two-part solution that is mixed upon application or shortly prior to application, or as a one-part solution. The composition can generally be applied by spraying, misting, swabbing, sponging, dripping, pouring, wiping, or any other suitable method. The composition can be mixed in an applicator, such as in the nozzle of a two-chamber spray bottle, or in a spray nozzle. The first part may include an aqueous solution of hydrated copper(II) sulfate (e.g., copper (II) sulfate pentahydrate or another suitable hydrate). A one-part use solution may comprise about 0.005 to 1.0 wt-%, about 0.01 to 0.5 wt-%, about 0.02 to 0.2 wt-%, or about 0.05 to 0.1 wt-% of hydrated copper (II) sulfate. If the composition is provided as a two-part solution, the first part comprising the copper sulfate may comprise about 0.01 to 0.5 wt-%, about 0.05 to 0.3 wt-%, about 0.10 to 0.25 wt-%, or about 0.12-0.18 wt-% of hydrated copper(II) sulfate. The first part may further comprise stabilizing agents, such as tartaric acid or salts thereof (e.g., sodium tartrate), iodides (e.g., potassium iodide), alkalinity sources, such as metal hydroxides or carbonate salts and buffering agents (e.g., sodium hydroxide, sodium carbonate, and sodium bicarbonate, or citric acid and sodium citrate). The second part may comprise an aqueous solution of a reagent that is capable of reacting with $Cu^{2+}$ and forming a colored product, such as bicinchoninic acid (BCA) or a salt thereof; salicylic acid or a salt thereof; 3-hydroxyflavone; or certain organic acids and their salts. Examples of suitable organic acids include ascorbic acid, citric acid, or an organic acid having a benzene ring structure. The first part of the two-part solution will be mixed with the second part so that the ratio of copper sulfate to the copper sequestrant (e.g., BCA) is about 10:1 to 1:20, about 5:1 to 1:15, about 1:1 to 1:10, or about 1:3 to 1:7 on a weight basis. The second part of a two-part solution may comprise about 0.2 to about 3.0 wt-%, about 0.4 to about 2.0 wt-%, or about 0.5 to about 1.5 wt-% of the reagent capable of reacting with $Cu^{i+}$. The second part may further comprise alkalinity sources, such as metal hydroxides or carbonate salts, tartaric acid or a salt thereof (e.g., sodium tartrate) and buffering agents (e.g., sodium hydroxide, sodium carbonate, and sodium bicarbonate, or citric acid and sodium citrate). If the composition is prepared as a one-part solution, the composition may comprise about 0.05 to about 3.0 wt-%, about 0.1 to about 2.0 wt-%, or about 0.2 to about 1.5 wt-% of the reagent capable of reacting with Cu'.+The pH of the composition (e.g., the first part and the second part, or the mixed formulation) may from about 8 to about 13.5, from about 8.5 to about 13, from about 9 to about 12.5, from about 9.5 to about 12, from about 10 to about 11.5, or from about 10.5 to about 11.4. The pH of the composition can be adjusted by including typical pH adjusting agents, such as carboxylic acids (e.g., formic acid, acetic acid, propanoic acid, butanoic acid, pentanoic acid, hexanoic acid, heptanoic acid, octanoic acid, nonanoic acid, decanoic acid, undecanoic acid, dodecanoic acid, glycolic acid, lactic acid, salicylic acid, acetylsalicylic acid, mandelic acid, etc.); inorganic acids, such as mineral acids (e.g., phosphoric acid, nitric acid, hydrochloric acid, sulfuric acid); alkali metal hydroxide (e.g., NaOH, KOH); and carbonate salts (e.g., sodium carbonate, sodium bicarbonate). The composition may also comprise additional agents, such as diluents (e.g., water, alcohols, glycol ether, or other water-soluble organic solvents), solubilizers, stabilizers (e.g., alkali metal salts such as bicarbonates, carbonates, potassium sodium tartrate and their hydrates, potassium iodide, dibasic acids, and combinations thereof; alkali metal hydroxides such as potassium or sodium hydroxide and combinations thereof), surfactants (e.g., nonionic, anionic, or amphoteric surfactants), foaming agents, emulsifiers, rheology modifiers, colorants, fragrance, etc. When applied to a protein or biofilm on a surface, the composition develops a color within about 60 seconds or less, within about 10 seconds, within about 5 seconds, within about 3 seconds, within about 2 seconds, or within about 0.5 to about 45 seconds, or about 1 to about 30 seconds, or about 1 to about 10 seconds. The disclosed compositions can be used to improve overall cleaning when used as part of a training program or an audit program. The program can utilize a scoring system. The composition can be prepared so that it is safe and non-toxic and can be used without PPE.

Exemplary compositions are shown in TABLE 2 below.

TABLE 2

Exemplary Compositions

| Component | Composition A Amount (wt-%) | Composition B Amount (wt-%) | Composition C Amount (wt-%) | Composition D Amount (wt-%) |
|---|---|---|---|---|
| Part I | | | | |
| Copper sulfate (hydrated) | 0.01-0.6 | 0.02-0.5 | 0.05-0.3 | 0.10-0.25 |
| Stabilizers | 0-6.0 | 0.5-0.5 | 1.0-4.0 | 1.5-3.0 |
| Alkali metal hydroxide | 0-0.1 | 0-0.08 | 0-0.05 | 0-0.02 |
| Water | 93-99.8 | 94-99 | 95-98 | 96.5-98 |
| TOTAL | 100 | 100 | 100 | 100 |
| Part II | | | | |
| Sequestrant (e.g., BCA) | 0.05-3.0 | 0.1-2.0 | 0.4-1.8 | 0.5-1.5 |
| Stabilizers | 0-6.0 | 0.5-5.0 | 1.0-4.0 | 1.5-3.0 |
| Alkali metal hydroxide | 0-1.5 | 0-1.2 | 0.1-1.0 | 0.2-0.8 |
| Water | 90-99.95 | 92-98.5 | 93-98.5 | 95-98 |
| TOTAL | 100 | 100 | 100 | 100 |

EXAMPLES

Example 1

Application of the composition to a protein soiled surface was tested using a dual-chamber spray bottle (available from Deardorff Fitzsimmons Corp. in Merlin, OR). The spray head can be configured to vary the ratio of volume drawn from each of the chambers. Each trigger pull delivers about 0.5-1.5 g of spray. One chamber of the bottle contained part A, and the other chamber part B of the composition. The composition of part A and part B is shown in TABLES 3A and 3B.

TABLE 3A

Part A (biuret solution)

| Component | Amount (wt-%) |
|---|---|
| Water | 97.980 |
| Sodium bicarbonate | 1.420 |
| Potassium sodium tartrate tetrahydrate | 0.600 |
| Potassium iodide | 0.350 |
| Copper sulfate pentahydrate | 0.150 |
| Sodium hydroxide | 0.010 |
| TOTAL | 100 |

TABLE 3B

Part B (BCA solution)

| Component | Amount (wt-%) |
|---|---|
| Water | 96.100 |
| Sodium carbonate | 1.000 |
| Sodium bicarbonate | 1.000 |
| Bicinchoninic acid disodium salt | 1.000 |
| Sodium tartrate | 0.500 |
| Sodium hydroxide | 0.400 |
| TOTAL | 100 |

A plastic (HDPE) cutting board was soiled with soy protein on one half of the cutting board surface. The protein was allowed to dry on the surface. The cutting board surface was then sprayed with the composition using volume ratios of part A to part B of 1:1, 1.51:1, 1.84:1, 2.21:1, and 1:50. Four to five trigger pulls were used to cover the entire surface.

The concentration of the actives was 0.15% of copper sulfate pentahydrate in part A and 1% of BCA in part B. The ratios of the actives in the spray were, therefore, 1:6.58, 1:4.43, 1:3,67, 1:3.05, and 7.13:1, respectively.

Each of the ratios produced a color change. A purple color could be seen on the side of the cutting board that was soiled with protein. The color reaction started about 10 seconds after spraying using the ratio of 1:1, and about 3 seconds after spraying using the ratios of 1.51:1, 1.84:1, 2.21:1, and 1:50.

Example 2

Application of the composition of Example 1 was tested on various soils. The composition was sprayed onto the prepared surface at a ratio of 2:1 of part A to part B. The color change was observed visually and was recorded as "+"

(color change occurred) or "−" (no color change). Soil types and results are shown in TABLE 4.

The cooked chicken and cheese were applied by rubbing the substrate on the surface. Bread and cheese were tested by applying drops of the composition on the surface of the bread and cheese samples. Liquid samples (juices, sanitizer, hand soap) were applied onto the surface and allowed to dry before testing.

TABLE 4

Soil Type Testing

| Soil Type | Color Change |
|---|---|
| Cooked chicken | + |
| Orange juice | + |
| Tomato juice | + |
| Lettuce juice | Light + |
| Bacterial colonies | + |
| Sanitizer (Quaternary ammonium compound) | − |
| Hand soap | − |
| Bread | + |
| Cheese | + |
| Cheese, rubbed on surface | + |
| Biofilm | + |

It was observed that cooked chicken, juices, bacterial colonies, bread, cheese, and biofilm all produced a positive result. The sanitizer and hand soap did not react with the composition.

Example 3

The composition of Example 1 (part A and part B) was tested for detection of different types of soils. The composition was sprayed using the two-chamber spray bottle with the spray ratio set at 2:1 (part A to part B). The tests were done both on plastic and stainless steel surfaces, and both visible and invisible soils were tested. The types of soils and test results are shown in TABLES 5A and 5B below.

TABLE 5A

Soil Type Testing, Visible Soil on Plastic and Steel Surfaces

| Soil Type | Color Change |
|---|---|
| Raw Turkey | Positive |
| Raw Chicken | Positive |
| Raw Meat | Positive |
| Deli Turkey | Positive |
| Deli Meat | Positive |
| Juice | Positive |
| Milk Shake | Positive |
| Yogurt | Positive |
| Frying Oil | Slight Positive |

TABLE 5B

Soil Type Testing, Invisible Soil on Plastic and Steel Surfaces

| Soil Type | Color Change |
|---|---|
| Raw Turkey | Positive |
| Raw Chicken | Positive |
| Raw Meat | Positive |
| Deli Turkey | Positive |
| Deli Meat | Positive |
| Juice | Positive |
| Milk Shake | Positive |
| Yogurt | Positive |
| Frying Oil | Slight Positive |

It was observed that the composition produced a positive result (observable color change) on all soil types except for frying oil, which resulted in a slight positive color change. The color change was observed after about 3 seconds for invisible soils, and almost immediately upon application of the spray for visible soils.

Example 4

The composition of Example 1 (part A and part B) was compared to an ATP test on various surfaces of a milk shake machine after the machine was cleaned. A commercially available ATP swab test was used (POCKETSWAB® Plus, available from Charm Sciences, Inc. in Lawrence, MA). The results of the ATP test are given in Relative Light Units (RLU), such that higher readings correlate with higher amounts of ATP. The presence of ATP, or adenosine triphosphate, can be used to indicate the presence of biological soils.

The surfaces tested included the interior and exterior walls of the machine, as well as mixer shaft and nozzle. The ATP test was performed according to manufacturer's instructions. The test composition of Example 1 (part A and part B) was applied using a swab. The swab was wetted with part A of the composition, and was used to swab the test surface. Part B was applied to the swab from a pad wetted with part B of the composition.

The test results are shown in TABLE 6 below.

TABLE 6

Comparison with ATP

| Site | ATP | Test Composition |
|---|---|---|
| Interior wall | 1,317 | Positive |
| Shaft sides | 71,521 | Positive |
| Shaft base | 14,235 | Positive |
| Nozzle | 68,246 | Positive |
| Exterior sides | 4,585,162 | Positive |

It was observed that the composition produced an observable color change on each of the surfaces regardless of the ATP reading. The color change of the test composition was visible after about 3 seconds both on the swab and on the pad.

While certain embodiments of the invention have been described, other embodiments may exist. While the specification includes a detailed description, the invention's scope is indicated by the following claims. The specific features and acts described above are disclosed as illustrative aspects and embodiments of the invention. Various other aspects, embodiments, modifications, and equivalents thereof which, after reading the description herein, may suggest themselves to one of ordinary skill in the art without departing from the spirit of the present invention or the scope of the claimed subject matter.

What is claimed is:

1. A method for detecting protein on a surface, the method comprising:
   (a) applying a composition to the surface, wherein the composition comprises:

i. a first part comprising 0.01 to 0.18 wt-% hydrated copper (II) sulfate; and
ii. a second part comprising 0.2 to 3.0 wt-% of bicinchoninic acid to produce a visible color reaction when contacted with protein if present on the surface;
wherein the hydrated copper (II) sulfate and the bicinchoninic acid are applied at a ratio of 5:1 to a ratio of 1:7,
(b) observing any color reaction on the surface at room temperature within 30 seconds from applying the composition, wherein the color reaction indicates the presence of protein on the surface and the absence of the color reaction indicates the absence of protein on the surface,
(c) recording the presence or absence of a color reaction, and
(d) upon detection of the color reaction, training cleaning personnel on at least one of cleaning chemicals, cleaning tools, and cleaning techniques.

2. The method of claim 1, wherein the composition is applied by spraying, misting, foaming, swabbing, sponging, dripping, pouring, or wiping.

3. The method of claim 1, wherein the first part and the second part are provided as separate solutions that are mixed together prior to application.

4. The method of claim 1, wherein the surface is selected from the group of countertops, tables, shelves, trays, cutting boards, containers, coolers, refrigerators, freezers, cooking surfaces, display areas, display cases, slaughter areas, slaughter clean-up areas, sinks, equipment, cutters, mixers, tanks, extruders, conveyors, heaters, dryers, ovens, floors, drains, wall tile, doors, door knobs, beds, bed rails, furniture, hand rails, medical or dental equipment, medical or dental instruments, toilets, bed pans, shower rooms, cleaning tools, telephones, call buttons, or remote controls.

5. The method of claim 1, wherein the surface is selected from the group of toilets, sinks, walls, floors, drains, doors, door knobs, or hand rails.

6. The method of claim 1, wherein the surface is located on or in a restaurant, cafeteria, consumer kitchen, meat processing plant, food preparation surface, food service facility, food storage area, food storage surface, food serving surface, grocery store, deli, display area, display surface, food plant, hospital, healthcare setting, waiting room, patient room, patient preparation room, or operating room.

7. The method of claim 1, wherein the first part and the second part are applied in a volume ratio of 3:1 to a volume ratio of 1:1.

8. The method of claim 1, wherein the composition is applied to cover at least 75% of the surface.

9. The method of claim 1, wherein the composition has a pH of 8 to 10.8.

10. The method of claim 1, wherein the first part and the second part are provided as separate solution that are mixed together at the time of application.

11. The method of claim 1, wherein the first part and the second part are provided as a one-part use solution.

12. The method of claim 1, wherein the surface is a plastic surface.

13. The method of claim 1, wherein the surface is a metal surface.

14. The method of claim 1, wherein the surface is a food preparation surface.

15. The method of claim 1, wherein the color reaction develops within 10 seconds from applying the composition if protein is present.

16. The method of claim 1, wherein the color reaction develops within 5 seconds from applying the composition if protein is present.

17. The method of claim 1, wherein the protein is invisible before applying the composition.

18. The method of claim 1, wherein the composition is applied as part of a training program.

19. The method of claim 1, wherein the composition is applied as part of an evaluation program.

20. The method of claim 19, wherein recording comprises entering a result of the color reaction into a mobile application or software program.

21. The method of claim 20, wherein the mobile application or software program includes data fields for date, time, location, site, color result, corrective action, or a combination thereof.

* * * * *